(12) United States Patent
MacPhail (10) Patent No.: US 6,742,030 B1
(45) Date of Patent: May 25, 2004

(54) METHOD TO KEEP A PERSISTENT TRACE OF WEBLINK USE PER USER

(75) Inventor: Margaret Gardner MacPhail, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/977,297

(22) Filed: Nov. 24, 1997

(51) Int. Cl.[7] .............................................. A06F 15/173

(52) U.S. Cl. ........................ 709/224; 709/229; 709/225; 713/201

(58) Field of Search ................................. 709/224, 219, 709/203, 229, 225, 220; 705/10; 713/201

(56) References Cited

U.S. PATENT DOCUMENTS

| | | | | |
|---|---|---|---|---|
| 5,708,777 A | * | 1/1998 | Sloan et al. ................. | 713/201 |
| 5,712,979 A | * | 1/1998 | Graber et al. ............... | 709/224 |
| 5,717,860 A | * | 2/1998 | Graber et al. ............... | 709/227 |
| 5,761,436 A | * | 6/1998 | Nielson ....................... | 709/245 |
| 5,835,722 A | * | 11/1998 | Bradshaw et al. .......... | 709/225 |
| 5,848,396 A | * | 12/1998 | Gerace ......................... | 705/10 |
| 5,870,769 A | * | 2/1999 | Freund ........................ | 707/501 |
| 5,884,033 A | * | 3/1999 | Duvall et al. ................ | 709/206 |
| 5,890,164 A | * | 3/1999 | Nielson ....................... | 707/201 |
| 5,902,353 A | * | 5/1999 | Reber et al. ................. | 709/219 |
| 5,954,798 A | * | 9/1999 | Shelton et al. .............. | 709/224 |
| 5,960,429 A | * | 9/1999 | Peercy et al. ................... | 707/5 |
| 5,961,602 A | * | 10/1999 | Thompson et al. ......... | 709/229 |
| 5,987,611 A | * | 11/1999 | Freund ........................ | 713/201 |
| 5,991,735 A | * | 11/1999 | Gerace ......................... | 705/10 |
| 6,018,619 A | * | 1/2000 | Allard et al. ............... | 709/224 |

OTHER PUBLICATIONS mark.r.brown, using netscape 2, ISBN: 0–7897–0612–1, 1995.*
Internet Watch Dog (tm)–Internet and Pc monitoring software, ISSN; 1040–6646, Feb. 1996.*
WinWhatWhere (tracking time and Internet use), by Schultz, Keith ISSN: 0886–0556, Jun. 1997.*
ABSI Internet Kit, by Schwerin, Rich ISSN: 0899–1847, May 1996.*
Snffing out Internet Abuse, by Rapoza, Jim ISSN: 0740–1604, Jun. 1997.*
Using Software Corporate to Monitor Internet Use, by Meckbach, Greg, Jun. 1997.*

* cited by examiner

Primary Examiner—Dung C. Dinh
Assistant Examiner—Abfullani E. Salad
(74) Attorney, Agent, or Firm—Richard A. Henkler; Leslie A. Van Leeuwen; Bracewell & Patterson, L.L.P.

(57) ABSTRACT

A method of monitoring transmissions across a network by recording a history of user-selected network transmission requests to a network client in a trace object, wherein the history of user-selected network transmission requests includes a trace of one or more network links, assigning a unique identifier to the trace object, and saving the trace object. In the embodiment wherein the network is the Internet, the method records a sequence of links to sites on the World Wide Web. A web browser can allow toggling between a logging mode and a non-logging mode, in order to start and stop recording of link traces. Multiple traces from different network sessions can thus be merged into a single link sequence which can thereafter be used to revisit a network link contained in the history of network transmissions. Different link sequences can be combined to form procedures. Supervisors (e.g., parents) can control the creation and maintenance of trace objects and link sequences by requiring a security signature or password to enable toggling between the logging and non-logging modes.

17 Claims, 6 Drawing Sheets

METHOD TO KEEP A PERSISTENT TRACE OF WEBLINK USE PER USER

BACKGROUND OF THE INVENTION

1. Field of the Invention

The present invention generally relates to computer systems, and more particularly to a method and system for creating, maintaining and using a history of user-selected network transmission requests across a computer network. The present invention is adapted for use with the Internet's World Wide Web, but it is generally applicable to any computer (client) which receives transmissions across any type of network.

2. Description of Related Art

Figure 1:
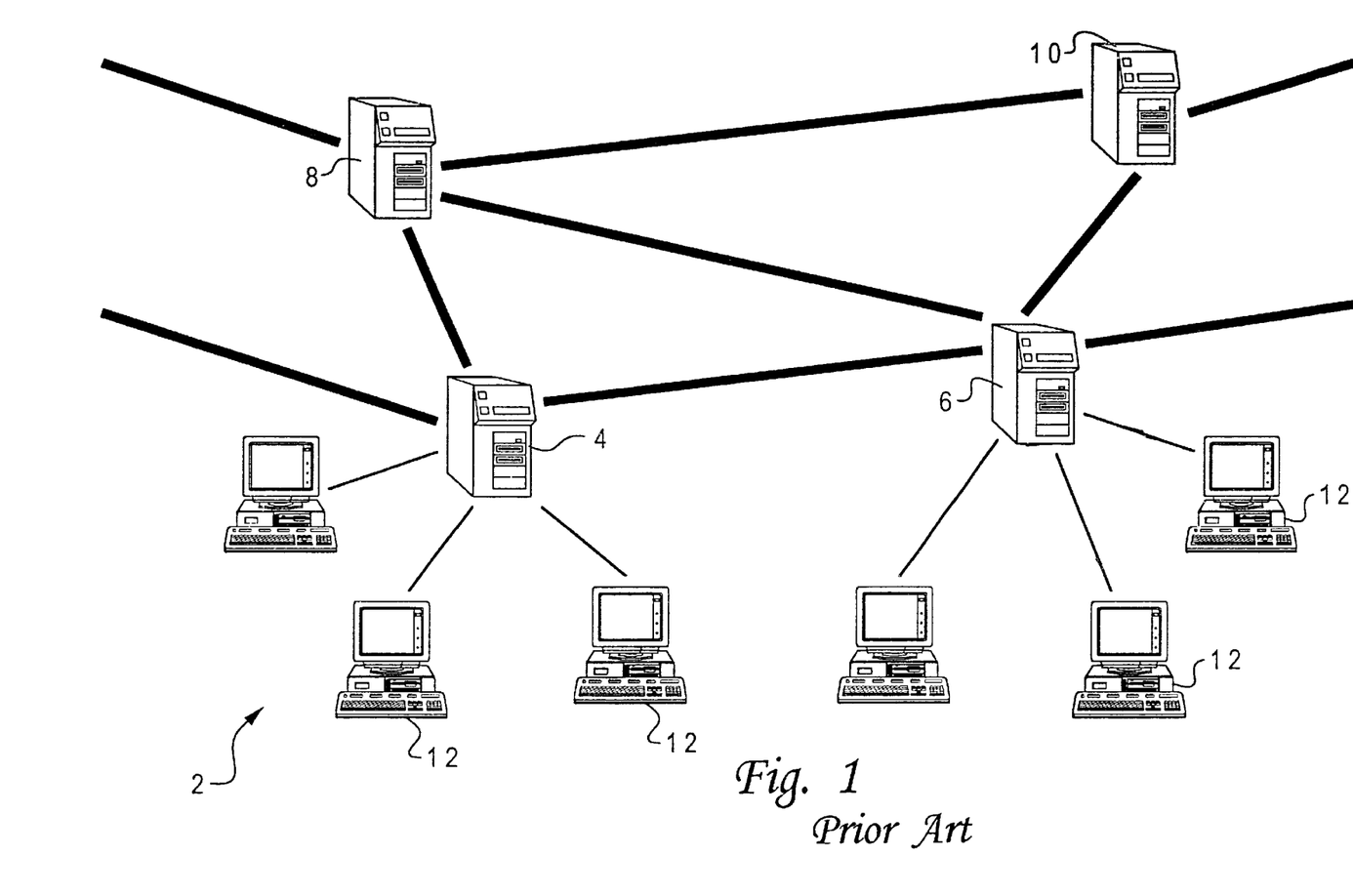
FIG. 1 is a diagram of a conventional computer network, including interconnected servers and workstation clients.

A generalized client-server computing network 2 is shown in FIG. 1. Network 2 has several servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at workstation clients 12. A client is a member of a class or group of computers or computer systems that uses the services of another class or group. Clients 12 can also be stand-alone computer systems (like personal computers, or PCs), or "dumber" systems adapted for limited use with network 2 (like network computers, or NCs). As used herein, "PC" generally refers to any multi-purpose computer adapted for use by a single individual, regardless of the manufacturer, hardware platform, operating system, etc. A single, physical computer can act as both a server and a client, although this implementation occurs infrequently.

The information provided by a server can be in the form of programs which run locally on a given client 12, or in the form of data such as files used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. In the context of a computer network such as the Internet, a client is a process (i.e., a program or task) that requests a service which is provided by another program. The client process uses the requested service without having to "know" any working details about the other program or the service itself. Based upon requests by the user, a server presents filtered electronic information to the user as server responses to the client process.

Conventional protocols and services have been established for the Internet which allow the transfer of various types of information, including electronic mail, simple file transfers via FTP, remote computing via TELNET, gopher searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the object pathname. For example, the URL "http://www.uspto.gov" (home page for the U.S. Patent & Trademark Office) specifies a hypertext transfer protocol ("http") and a pathname of the server ("www.uspto.gov"). The server name is associated with a unique numeric value (a TCP/IP address, or "domain").

The present invention relates to the monitoring or recording of the history of user-selected network transmission requests which have occurred across a network like the Internet, but is particularly applicable to the World Wide Web, which provides files that are conveniently linked for user access. A group of documents (or web "pages") can be interrelated by providing hypertext links in each of the files. A hypertext link is an image that is viewable on the workstation's display, which can be selected by the user (e.g., using a pointing device or "mouse") and which then automatically instructs the client workstation to request another page associated with that particular hypertext link (i.e., issue another URL). A hypertext link may appear as a picture, or as a word or sentence, possibly underlined or otherwise accentuated to indicate that it is an embedded link and not just normal, informative text. Hypertext files are commonly written in hypertext markup language (HTML).

A WWW page may have text, graphic (still) images, and even multimedia objects such as sound recordings or moving video clips. A hypertext page, if more than just text, is usually constructed by loading several separate files. For example, the hypertext file "main.html" might include a reference to a graphic image file "picture.gif" or to a sound file "beep.wav". When a client workstation sends a request to a server for a page, the server first transmits (at least partially) the main hypertext file associated with the page, and then loads, either sequentially or simultaneously, the other files associated with the page. A given file may further be transmitted as several separate pieces via TCP/IP protocol. The fully constructed page is then displayed on the workstation monitor. A page may be "larger" than the physical size of the monitor screen, and techniques such as scroll bars are used by the network communications software to view different portions of the page. This software, commonly referred to as a web browser, provides a graphical user interface (GUI) for transmitting and receiving information across the Internet.

A wide variety of methods are employed to maintain histories of web sites visited using a browser. For example, a list of favorite places, or "bookmarks," can be constructed by clicking on a toolbar icon in the GUI (or using a pull-down menu command, or a keystroke combination) to add the current URL to a special file having a list of URLs which the user might want to repeatedly download, at later times. Many browsers also maintain a cache of various downloaded files (main hypertext files, multimedia files, etc., forming respective pages) so that, if a page is reloaded by the user, the client computer does not have to actually download the files across the network again, but can construct the page locally.

Another manner in which a history can be maintained is by keeping a list or table of every URL which is downloaded by the browser. These URLs can be, for example, a running trace of pages that were requested when a user selected a hypertext link, or pages that were delivered as a result of CGI (Common Gateway Interlace) programs running at various servers which generated ad hoc HTML pages, or pages that were requested by manual (keyboard) entry of the URLs. The history table can be emptied or deleted at the end of a session, or be saved and the data updated with URLs from future sessions. Some browsers allow a user to create a bookmark by selecting an entry in the history table, and then selecting a "Create Bookmark" icon or button. The URL is then copied from the history table to the bookmark file. Many browsers also allow a user to conveniently recall a page from the history table by simply selecting an entry and then selecting a "Go To" icon or button (or double-clicking on the entry using a pointer device).

Yet another manner in which a user may be made aware of historical links is to compare the contents of a history table to hypertext links that are currently being displayed by the browser (i.e., links embedded in the currently loading web page), such that those links which have previously been visited can be specially highlighted. This highlighting can take the forming of underlining, bolding, or changing the color of the previously visited links. Highlighting of visited links can be made to expire when, e.g., a certain period of time has passed for the given link (like ninety days).

Sometimes a user will go through several links in a session, then end the session, and the history table will be automatically deleted (or perhaps the user will clear the table as its contents have gotten excessively large from merging the URLs visited over many different sessions). Later, the user may wish that a bookmark had been kept or that a sequence of links had been kept. Recreating the desired sequence of links can be a difficult and time-consuming task. Alternatively, a user may wish that no record be kept of a link or link sequence for privacy reasons, e.g., when the browser is shared between family members. Conversely, supervisors (or parents) might like to have a trace of links to see what their subordinates (or children) have been viewing, even if the subordinates had cleared the browser's history table/cache. It would, therefore, be desirable to provide a more flexible method of organizing and saving link sequences. It would be further advantageous if the method allowed the sequences to be easily incorporated into other processes.

SUMMARY OF THE INVENTION

It is therefore one object of the present invention to provide an improved method of maintaining a history of user-selected network transmission requests across a network, particularly to a given client in a client-server network.

It is another object of the present invention to provide such a method that is adapted for use with the World Wide Web, and implemented in associated communications software or web browsers.

It is yet another object of the present invention to provide such a method wherein link traces can be kept, and sequences of links can be organized and saved, such that they can be reused and added together to form procedures.

The foregoing objects are achieved in a method of monitoring transmissions across a network, generally comprising the steps of connecting a client to a network, recording a history of user-selected network transmission requests to the client in a trace object, wherein the history of user-selected network transmission requests includes a trace of one or more network links (representative of user-selected network requests), assigning a unique identifier to the trace object, and saving the trace object. The network can be a client-server network such as the Internet, and the recording step can record a sequence of links to sites on the World Wide Web. The client uses communications software, such as a web browser, to interface with the network, and the software can allow toggling between a logging mode and a non-logging mode, in order to start and stop recording of link traces. Multiple traces from different network sessions can thus be merged into a single link sequence. The sequence can thereafter be used to revisit a network link contained in the history of user-selected network transmission requests. A first link sequence from the history of user-selected network transmission requests can be combined with a second link sequence to form a procedure. Supervisors can control the creation and maintenance of trace objects and link sequences by requiring a security signature to enable toggling between the logging and non-logging modes.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE ILLUSTRATIVE EMBODIMENT

The present invention is directed to a method of creating, maintaining and using a history of user-selected network transmission requests across a computer network, such as the network of FIG. 1, and particularly to a method and computer program product for saving and manipulating sequences of links to sites (pages) on the Internet's World Wide Web (WWW). The invention may, however, be implemented in other networks besides the Internet. Therefore, while the present invention may be understood with reference to FIG. 1, this reference should not be construed in a limiting sense.

Figure 2:
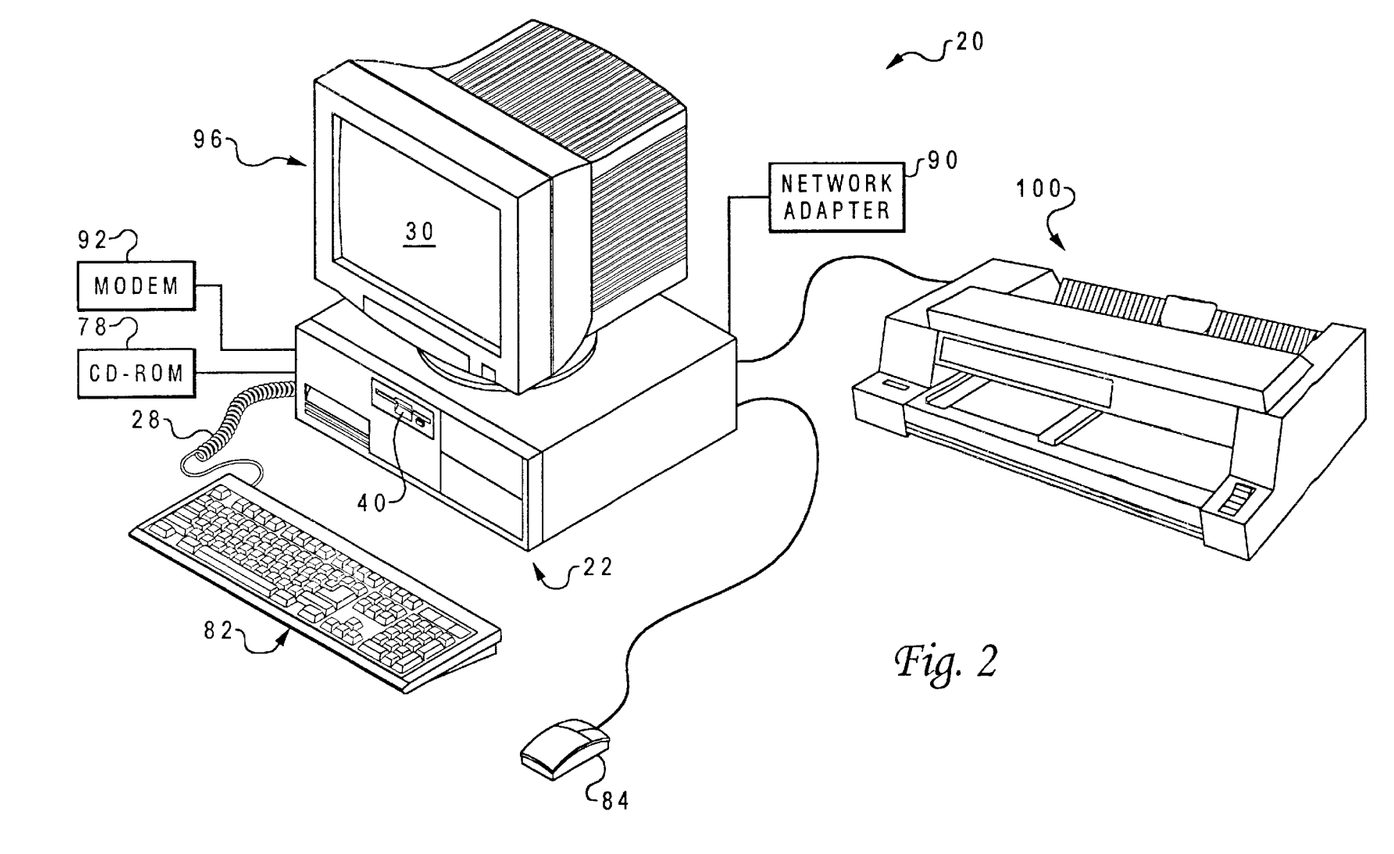
FIG. 2 is an illustration of one embodiment of a data processing system in which the present invention can be practiced.

With further reference to FIG. 2, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be constructed using any one of several known off-the-shelf components.

Figure 3:
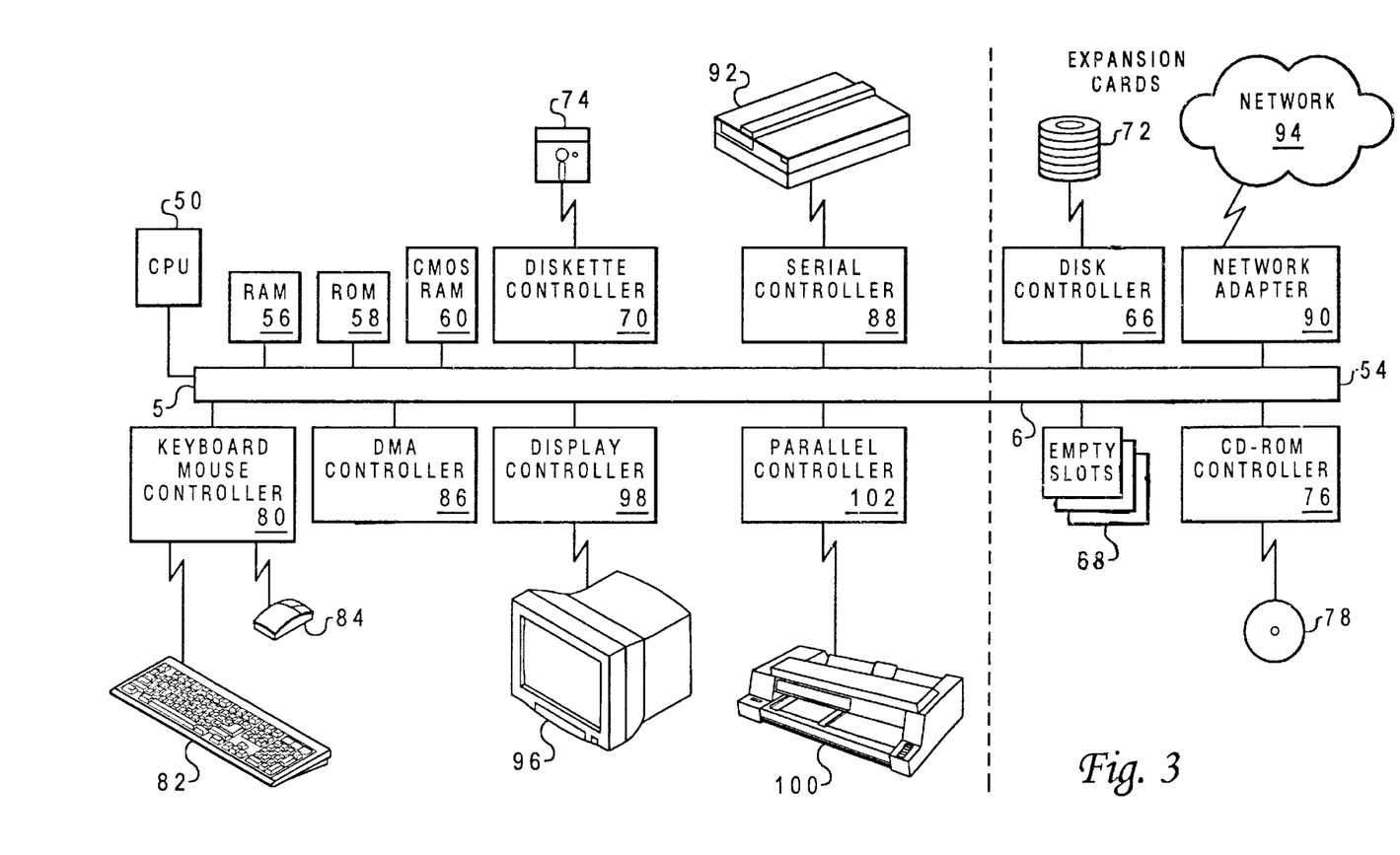
FIG. 3 is a high-level block diagram illustrating selected components that can be included in the data processing system of FIG. 2 according to the teachings of the present invention.

Reference now being made to FIG. 3, a high level block diagram is shown illustrating selected components that can be included in the data processing system 20 of FIG. 2 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 3, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively, which provide permanent storage of computer data. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service, such as an information service provided under the registered service mark "PRODIGY". Such on-line service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data 25 processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 3. Those skilled in the art will appreciate that a data processing system constructed in accordance with the present invention may have multiple components selected from the foregoing, including even multiple processors.

Figure 4:
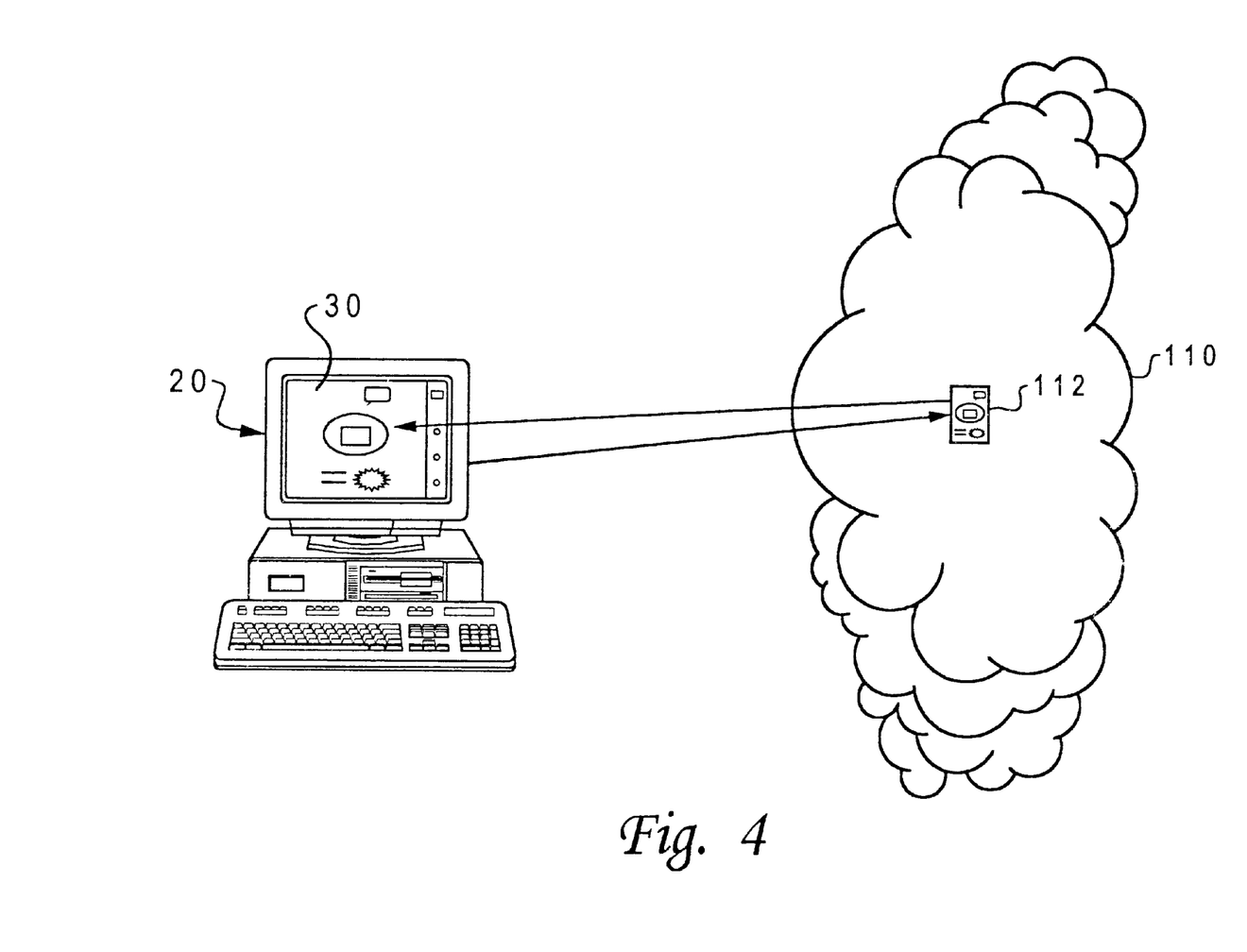
FIG. 4 is a conceptual illustration of a computer downloading a network document, such as a page from the World Wide Web of the Internet.

Referring now to FIG. 4, one implementation of the present invention allows data processing system 20 to act as a client, and to request and receive data transmissions from a network, particularly from Internet servers. Data processing system 20 has loaded therein, and executing within CPU 50, a communications program constructed in accordance with the present invention, such as a browser, that provides a graphical user interface (GUI) with Internet 110 on display 30, and particularly with the WWW. By means of the GUI, a user can request a web page, such as by selecting a hypertext link in a currently loaded document, or by activating a CGI program which generates an ad hoc HTML page, or by manual (keyboard) entry of a URL. FIG. 4 illustrates a web page 112 which has been loaded on data processing system 20 and a portion of which is visible on display screen 30.

Figure 5:
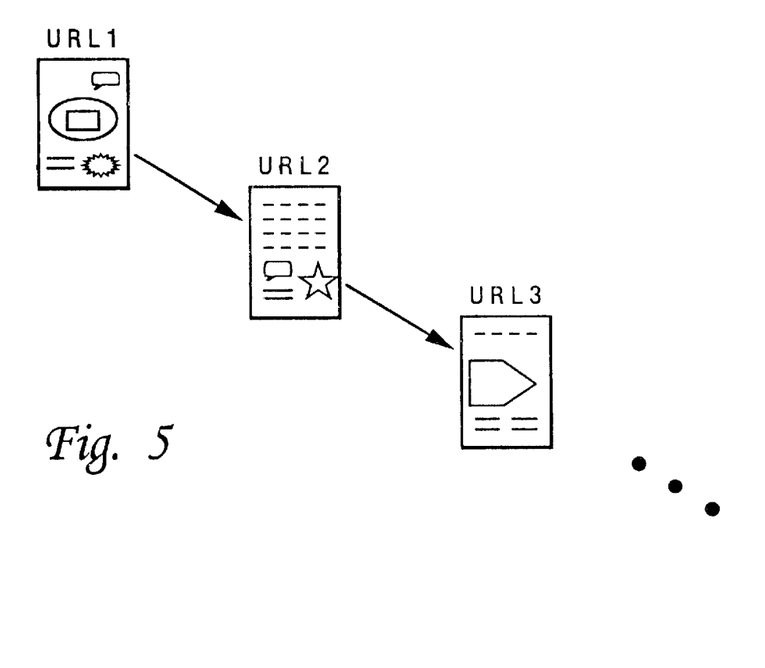
FIG. 5 is a conceptual illustration of a user's progression between links during a network session.

As further illustrated in FIG. 5, a user creates a trace of one or more user-selected network transmission requests (e.g., links (URLs)) during each communications session, as each new page is downloaded (or requested). The particular order of the URLs may correspond to a logical progression through a series of hypertext links, or may have no apparent logical order due to the random entry of URL requests. The present invention provides the browser with a set of weblink trace functions to monitor and record weblink sequences such that link traces can be started and stopped, and organized into one or more link sequence objects which can be named and described by the user. These one or more link sequence objects can then be saved as a reusable entity.

Figure 6:
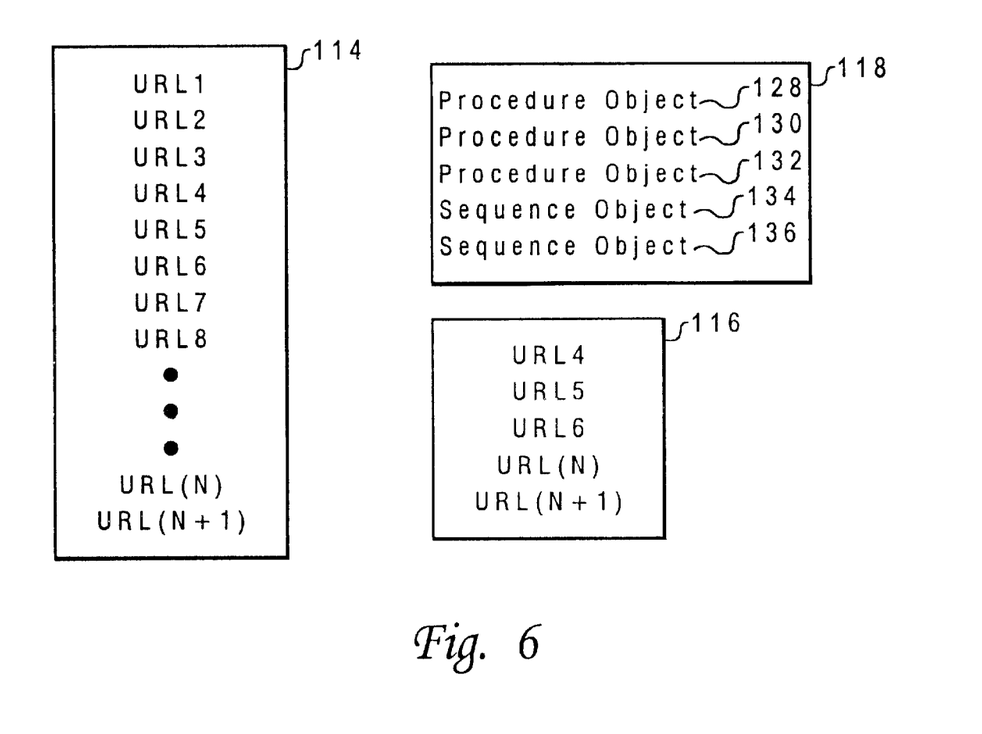
FIG. 6 is a conceptual illustration of the creation of a trace object based on a link trace created from a progression such as that shown in FIG. 5.

FIG. 6 depicts a weblink trace object 114 from which a link sequence trace object 116 has been constructed. For example, the GUI or browser may include an appropriate command to toggle back and forth between the two modes of logging and non-logging of the link trace. This log command might be executed by selecting a pull-down menu item or toolbar icon with pointing device 84, or by entering a particular keystroke combination on keyboard 82. When logging is activated, an object name or object-identifier must be selected for the trace object (an object used to trace, or log, one or more links activated). If a new trace object is to be started/created, then a new name can be entered. If a user desires to supplement an existing trace object, then the name of the existing trace object can be entered. While logging is active, each URL that is downloaded (or perhaps requested, regardless of whether it is successfully downloaded) is added to the list of URLs in the trace object. In this manner, multiple trace objects (from the same or different sessions) can be merged into a single link sequence.

Figure 7:
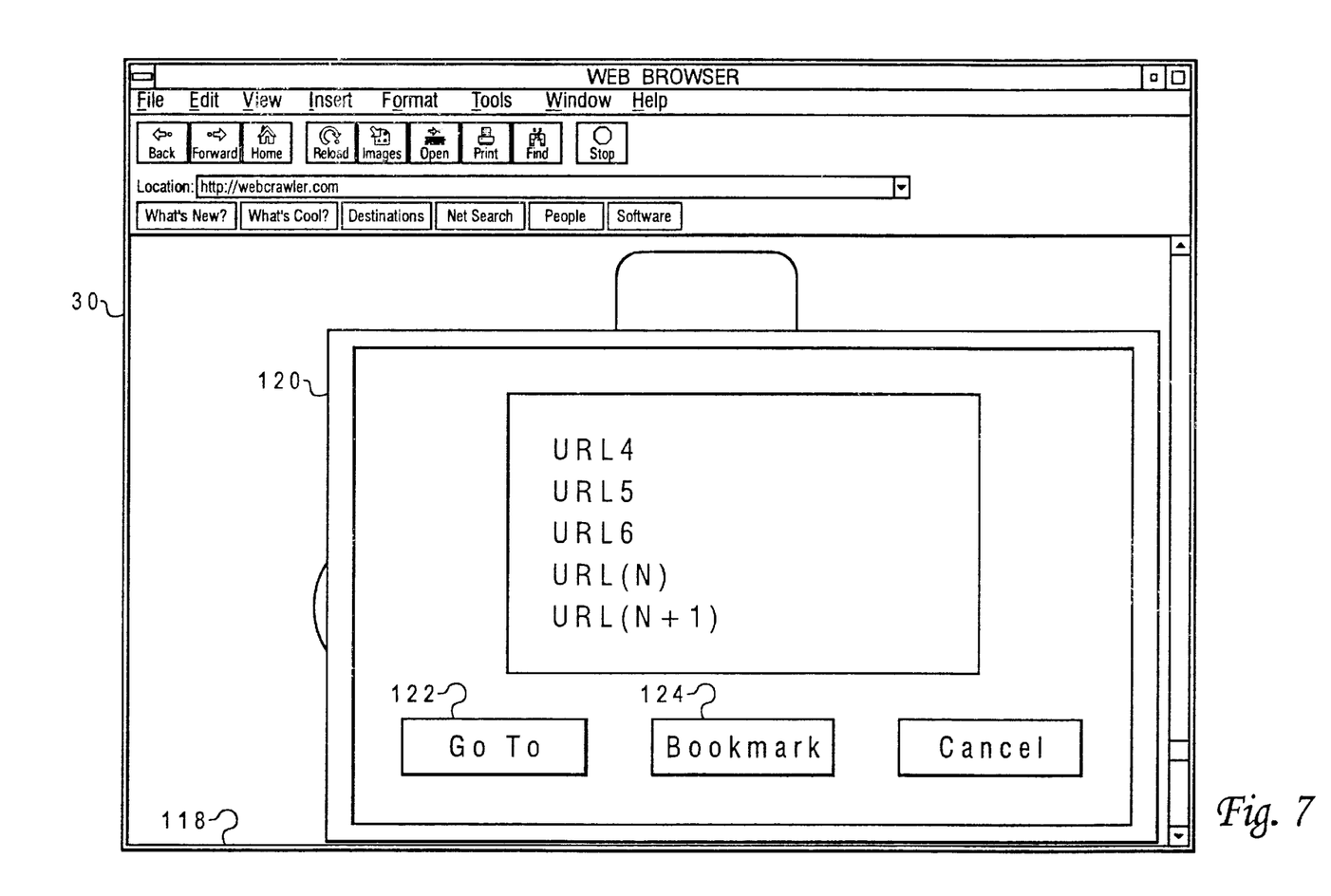
FIG. 7 is a depiction of a display of a data processing system which has generated a unique trace object having a network link sequence in accordance with the present invention.

If a user has created a trace object, he or she can later use it in other ways. FIG. 7 shows a browser 118 wherein a pop-up window 120 has been activated to view a named sequence (e.g., sequence object 116). From this pop-up window, a user may quickly revisit (download) a particular page by simply double-clicking on an entry, or by selecting an entry and then selecting the "Go To" button 122. If a page has not been previously saved in a bookmark-type file, then it can be added by selecting the entry and then selecting the "Bookmark" button 124, to allow the user to revisit the site later by using the bookmark file.

A link sequence can become a procedure by allowing a web browser to proceed through the links in order. Link sequences can further be added together to form super- and sub-procedures. These procedures can be easily incorporated into other processes, such as by using Java script. For example, link sequences can be created and used by webmasters and software developers to provide predefined web sequences, such as a developer's path through an extensive WWW site.

The foregoing described procedure is illustrated via procedure object 118. Procedure object 118 contains an ordered collection of sequence objects 128–132 and (optionally) other procedure objects 134, 136.

The present invention can further be implemented to allow link tracing to be started and stopped by a supervisor (e.g., parent) with a security signature (i.e., password). Supervisors might like to have a trace of links to see what their subordinates (including children) have been viewing, even if the subordinates had cleared the browser's history table/cache. The present invention would retain a supervisor's trace object notwithstanding attempts by other users to delete the object or modify its contents. Different trace objects can be kept for individual users sharing a single workstation.

The illustrative embodiment of the present work has been described as being implemented via the use of objects. It will be understood by those within the art that the use of objects is not essential (e.g. a log file could be used instead of a trace object). However, implementation via objects gives rise to a number of advantages such as the advantage of encapsulation (e.g. the ability of automatically initiating and verifying the links) and component re-use.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of recording transmissions across a network, comprising the steps of:

connecting a client to a network;

responsive to a user input at a user-detemined time during an established network transmission, toggling on a trace object on said client to trace a user selection of one or more network links associated with sites on said network;

in response to said toggling on step, dynamically recording in said trace object on said client a history of user-selected network transmission requests of the client, wherein the history of user-selected network transmission requests includes a copy of said one or more network links represented by hotlinks that reopens an associated network site responsive to a later user selection;

toggling off said trace object when said recording step is terminated at a next user-determined time during said network transmission, wherein only network links selected between said toggling on and said toggling off steps are saved within said trace object;

assigning a unique identifier to the trace object;

saving the trace object; and revisiting a site associated with a network link among said one or more network links by selecting the corresponding hotlink within trace object.

2. The method of claim 1 wherein:

said connecting step connects the client to the Internet; and said recording step records a sequence of links to sites on the World Wide Web in a single trace object.

3. The method of claim 1 further comprising the step of combining a first link sequence from the history of user-selected network transmission requests with a second link sequence to form a procedure.

4. The method of claim 1 wherein said recording step merges multiple traces from different network sessions into a single link sequence.

5. The method of claim 1 wherein said assigning step includes the step of selecting an existing trace object for recordation of the history of a present user-selected network transmission requests.

6. The method of claim 1 wherein said step of saving the trace object stores the trace object on a permanent storage device of the client.

7. The method of claim 1 further comprising the step of requiring a security signature to enable said toggling between said on and off states.

8. A computer program product comprising:

a storage medium adapted to be read by a computer; and program means stored on said storage medium for:

establishing a connection between the computer (client) and a network, responsive to a user input at a user-determined time, allowing a user to control the recording of a history of network transmissions by toggling between a non-logging mode and a logging mode, toggling on a trace object on said client to trace a user selection of one or more network links associated with sites on said network, recording in said trace object on said client a history of user-selected network transmission requests of the client following said toggling on step, wherein the history of user-selected network transmission requests includes a copy of said one or more network links represented by hotlinks that reopens an associated network site responsive to a later user selection of one of said hotlinks, toggling off said trace object when said recording step is tested via user input, wherein only network links selected between said toggling-on and said toggling-off steps are saved within said trace object, assign a unique identifier to the trace object, and enabling revisiting of a site associated with a network link among said one or more network links by a user select the corresponding hotlink within the trace object.

9. The computer program product of claim 8, wherein said program means further includes means for saving the trace object on a permanent storage device of the computer.

10. The computer program product of claim 8, wherein said program means establishes a connection between the computer and the Internet and records a history of network transmissions of World Wide Web pages to the computer.

11. The computer program product of claim 8, wherein said program means combines a first link sequence from the history of network transmissions with a second link sequence to form a procedure responsive to a user request.

12. The computer program product of claim 8, wherein said program means merges multiple traces from differ network sessions into a single link sequence.

13. The computer program product of claim 8, wherein said program means assigns the unique identifier by selecting an existing trace object for recordation of the history of a present user-selected network transmission requests.

14. The computer program product of claim 8, wherein said program means requires a security signature to enable said toggling between said non-logging mode and said logging mode.

15. The method of claim 7, further comprising the step of providing a supervisor password for access to said trace object, wherein said trace object can not be accessible or erased from said client without said password, thus enabling a supervisor to monitor a usage of said client in accessing network links.

16. The computer program product of claim 14, wherein said program means further comprises the step of providing a supervisor password for access to said trace object, wherein said trace object can not be accessed or erased from said client without said password, thus enabling a supervisor to monitor a usage of said client in accessing network links.

17. A computer system comprising:

a computer program product as recited in claim 8; and processing resources coupled to said program product that execute said program means.

* * * * *